(12) United States Patent
Tsutsui

(10) Patent No.: US 6,390,272 B1
(45) Date of Patent: May 21, 2002

(54) ARTICLE CONVEYING DEVICE

(75) Inventor: Shoji Tsutsui, Iwakuni (JP)

(73) Assignee: Toyo Jidoki Co., Ltd., Tokyo (JP)

( * ) Notice: Subject to any disclaimer, the term of this patent is extended or adjusted under 35 U.S.C. 154(b) by 0 days.

(21) Appl. No.: 09/523,857

(22) Filed: Mar. 13, 2000

(30) Foreign Application Priority Data

Mar. 11, 1999 (JP) ............................................ 11-064200
Feb. 15, 2000 (JP) ............................................ 12-036276

(51) Int. Cl.$^7$ ............................................. B65G 15/00
(52) U.S. Cl. ............................... 198/343.1; 198/803.14; 198/867.11
(58) Field of Search ........................ 198/343.1, 867.11, 198/803.14

(56) References Cited

U.S. PATENT DOCUMENTS

| | | | |
|---|---|---|---|
| 2,551,080 A | | 5/1951 | Allen et al. ............... 198/343.1 |
| 4,602,774 A | * | 7/1986 | Kobler ................ 198/476.1 X |
| 5,660,264 A | | 8/1997 | van der Schoot ........... 198/594 |
| 6,019,214 A | * | 2/2000 | Herronen et al. .... 198/343.1 X |
| 6,035,994 A | * | 3/2000 | Blatter .................... 198/343.1 |

* cited by examiner

Primary Examiner—Stephen T. Gordon
Assistant Examiner—Lori L Coletta
(74) Attorney, Agent, or Firm—Koda & Androlia

(57) ABSTRACT

A conveying device in which articles supplied intermittently in a plurality of rows are discharged continuously in a single row, comprising a rotational conveying mechanism and a reciprocating driving mechanism. The rotational conveying mechanism rotationally conveys numerous empty-bag holding members disposed at equal intervals in one direction along a ring-form track (or race-track path) which has a pair of parallel sections, and the reciprocating driving mechanism causes the rotational conveying mechanism as a whole to perform a reciprocating movement through a specified distance along the parallel sections of the ring-form track. On a supply side of the parallel sections, the empty-bag holding members are moved intermittently by a distance that is equal to an integral multiple of an attachment spacing of the empty-bag holding members; while on a discharge side of the parallel sections, the empty-bag holding members are moved continuously at a constant speed. Empty bags are supplied to the empty-bag holding members when the empty-bag holding members are stopped on the supply side, and these empty bags are discharged downward from the empty-bag holding members on the discharge side of the parallel sections and inserted into grooves of retainers that are conveyed at a constant speed.

4 Claims, 17 Drawing Sheets

FIG. 3

| OPERATING PATTERN | | ADVANCE RETURN ADVANCE RETURN ADVANCE |
|---|---|---|
| SPEED OF MOTOR M₁ (ROTATIONAL CONVEYING SPEED OF EMPTY-BAG HOLDING MEMBERS) | $U_2$ $U_1$ 0 | |
| SPEED OF MOTOR M₂ (SPEED OF RECIPROCATING MOVEMENT OF ROTATIONAL CONVEYING MECHANISM) | $U_3$ 0 $-U_4$ | |
| SPEED OF MOTOR M₃ (RETAINER CONVEYING SPEED) | $V_\theta$ 0 | |
| SYNTHESIZED SPEED OF EMPTY-BAG HOLDING MEMBERS ON BAG ENTRY SIDE | $-V_3$ (0) $-V_4$ | |
| SYNTHESIZED SPEED OF EMPTY-BAG HOLDING MEMBERS ON BAG EXIT SIDE | $V_1$ ($V_2$) 0 | |

ARTICLE CONVEYING DEVICE

BACKGROUND OF THE INVENTION

1. Field of the Invention

The present invention relates to an article conveying device which is used to convey a plurality of articles such as bags or containers at a high speed and more particularly to a conveying device in which articles supplied intermittently in a plurality of rows are discharged continuously in a single row or articles supplied continuously in a single row are discharged intermittently in a plurality of rows.

2. Prior Art

Japanese Patent Application Laid-Open (Kokai) No. H2-296617 (corresponding to U.S. Pat. No. 5,096,041) discloses a conveying device in which an endless conveyor on which numerous holders are disposed at equal intervals rotates in one direction along a ring-form track that has a pair of parallel sections and in which the operating characteristics differ between first side of the parallel sections and the second side of the parallel sections. In one set of operating characteristics, the endless conveyor moves intermittently on the first side and runs continuously on the second side. As a result of these operating characteristics, a plurality of holders can be simultaneously supplied with articles on the first side of the conveying device, and these articles can be continuously discharged on the second side of the conveying device.

The above-described prior art discloses in a concrete manner a mechanism for obtaining different operating characteristics on the different sides of the respective parallel sections of an endless conveyor. This mechanism is equipped with a pair of rolls which are rotably held on a carriage, an endless conveyor which is mounted on these rolls, a driving wheel which rotationally derives the endless conveyor, and a cam which is mounted on a common drive shaft with the driving wheel and rotates together with the riving wheel so that the carriage performs a reciprocating movement.

Furthermore, in Japanese Patent Application Laid-Open (Kokai) No. H10310230, a conveying device is described. In this conveying device, an endless chain on which numerous holders are disposed at equal intervals is mounted on a pair of sprockets so that the endless chain is rotated in one direction along a ring-form track which has a pair of parallel sections. The endless chain intermittently stops on a first side the parallel sections and runs continuously on a second side of the parallel section.

The above-described prior art disclosed in a concrete manner a mechanism for obtaining different operating characteristics on the different sides of the respective parallel sections. This mechanism which is equipped with: a separate pair of sprockets installed coaxially in positions beneath the pair of sprockets, an endless chain used for driving which is mounted on this separate pair of sprockets, a connecting member which holds the pair of sprockets so that the sprockets are rotatable, and intermittent-driving and continuous-driving sprockets which are respectively disposed on the first and second sides of the parallel sections of the endless chain used for driving.

In the conveying devices described above, a single row or a plurality of rows of articles supplied intermittently on the first side of the parallel sections can be continuously discharged in a single row on the second side of the parallel section. However, in the case of the mechanism described in Japanese Patent Application Laid Open (Kokai) No. H2-296617, the reciprocating movement of the carriage is accomplished by a cam, and the cam and driving wheel are simultaneously rotated by a single drive shaft. As a result, the system can only be operated in a pattern determined at the time of the initial setting of the stroke of the carriage and the number of article supplied at one time, etc. Thus, the system lacks all-purpose adaptability.

On the other hand, in the case of the mechanism described in Japanese Patent Application Laid-Open (Kokai) No. H10-310230, the mechanism has a structure in which all of the loads involved in the realization of the above-described operating characteristics (the sprockets that perform a reciprocating movement, the numerous holders that change their running speed, etc.) are applied to a single endless chain used for driving. As a result, an unreasonable amount of force is applied to the endless chain used for driving, so that this chain tends to stretch. Consequently, the positioning precision drops during operation (i.e., the stopping positions of the holders shift). Especially in the case of a high-speed operation, the acceleration of the sprockets and holders is great, so that the load applied to the chain is also increased. Moreover, in the conveying device described in Japanese Patent Application Laid-Open (Kokai) No. H10-310230, the articles are supplied in a single row; however, the positioning precision is even more important in cases where numerous articles are simultaneously supplied in a plurality of rows.

SUMMARY OF THE INVENTION

Accordingly, the present invention is made in light of the problems in the prior art.

The object of the present invention is to provide an article conveying device in which articles supplied intermittently in a plurality of rows are discharged continuously in a single row, or articles supplied continuously in a single row are discharged intermittently in a plurality of rows, and the article conveying device has all-purpose adaptability which allows the selection of various patterns of operating characteristics, etc., and the positioning precision of the conveying device is prevented from dropping even in the case of a high-speed operation.

The article conveying device of the present invention is provided with: a rotational conveying mechanism which rotationally conveys numerous article holding members disposed at equal intervals in one direction along a ring-form track (or a race-track shape path) that has a pair of parallel sections, and a reciprocating driving mechanism which causes the rotational conveying mechanism as a whole to perform a reciprocating movement for a specified distance along the parallel sections; and the rotational conveying mechanism and reciprocating driving mechanism have their own driving sources. In addition, the article holding members have a moving speed that is synthesized from the rotational conveyance and reciprocating movement, and the article holding members are moved intermittently a specified distance (which is a specified distance that is an integral multiple of the attachment spacing of the article holding members) on the first side of the parallel sections and are moved continuously at a constant speed on the second side of the parallel sections.

In this conveying device, it is desirable that the driving sources of the rotational conveying mechanism and reciprocating driving mechanism both be servo motors. Furthermore, in order to realize the above-described operating characteristics, the rotational conveying speed of the article holding members is set at different values during the advancing movement and return movement of the rotational conveying mechanism, and the speed of the advancing movement and the speed of the return movement of the rotational conveying mechanism are set at different values.

In the conveying device described above, articles are supplied simultaneously to a plurality of article holding members when the article holding members are stopped on the first side of the parallel sections and are successively discharged from the article holding members that are moving continuously on the second side of the parallel sections; or articles are continuously supplied to the article holding members that are moving continuously on the second side of the parallel sections and are simultaneously discharged from a plurality of the article holding members when the article holding members are stopped on the first side of the parallel sections.

BRIEF DESCRIPTION OF THE DRAWINGS:

FIG. 3 is a diagram which illustrates the operating pattern of the empty-bag holding member conveying device of the bag supply device;

DETAILED DESCRIPTION OF THE PREFERRED EMBODIMENTS

Below, an example in which the present invention is applied to a retainer type packaging system (i.e., a packaging system which is devised so that packaging bags (or containers) are accommodated in retainers, and various packaging operations such as filling with contents and sealing of the bag mouths, etc., are performed on the packaging bags while the retainers are conveyed) will be described in detail with reference to FIGS. 1 through 17.

Figure 1:
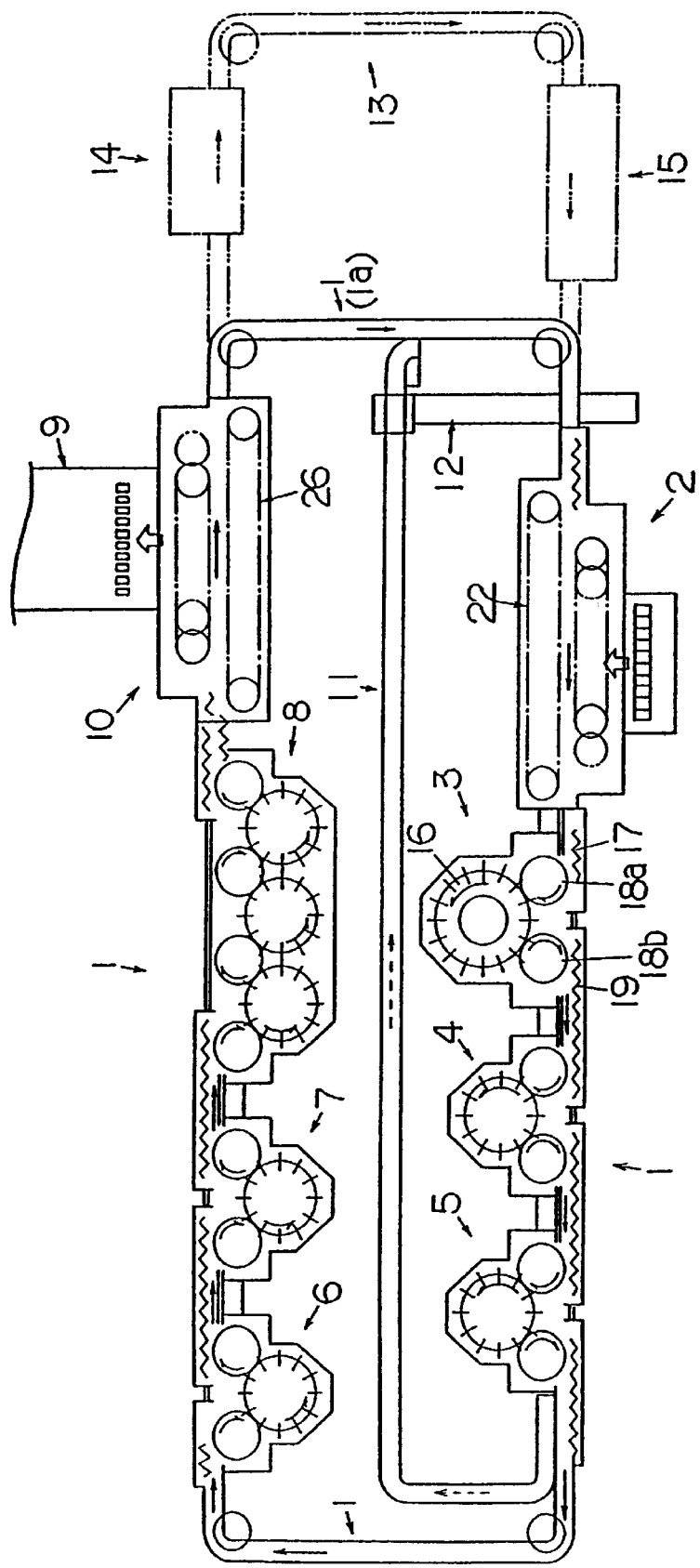
FIG. 1 is a schematic diagram which illustrates the overall retainer type continuous-filling packaging system according to the present invention.

First, FIG. 1 is a schematic plan view of the retainer type packaging system. In this retainer type packaging system, the retainers are conveyed by a conveyor along a conveying path formed in the shape of a loop, and are subjected to various packaging operations by a plurality of devices installed along this conveying path.

The devices disposed along the main conveying path (indicated by solid arrows) 1 are a bag supply device 2 which supplies empty bags to retainers conveyed at a constant speed, a bag mouth opening device 3, a liquid preparatory filling device 4, a solid matter filling device 5, a liquid filling device 6, a steam degassing device 7, a sealing device 8, and a discharge device 10 which extracts the full bags (full containers) held in the retainers conveyed at a constant speed and intermittently discharges these full bags onto a product-conveying conveyor 9.

Furthermore, a defective bag discharge device 12 is installed along a defective retainer discharge path 11 (indicated by broken-line arrows), and a retainer cleaning device 14 and drying device 15 are installed along a cleaning path 13 (indicated by a two-dot chain lines). The cleaning path 13 is ordinarily closed, and it is opened when the retainers have become soiled.

First, the various devices installed along the main conveying path 1 will be described.

Figure 14C:
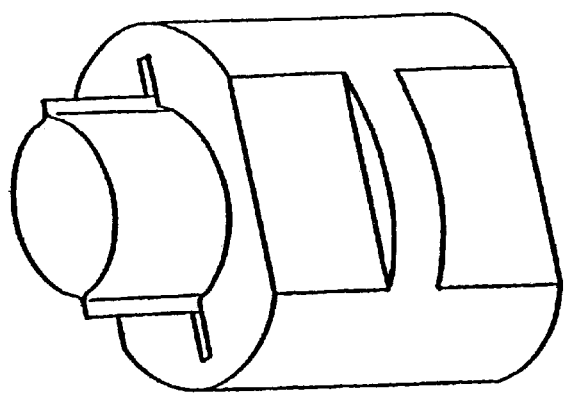
FIG. 14(c) shows the opening process of the bag in the retainer.
Figure 14B:
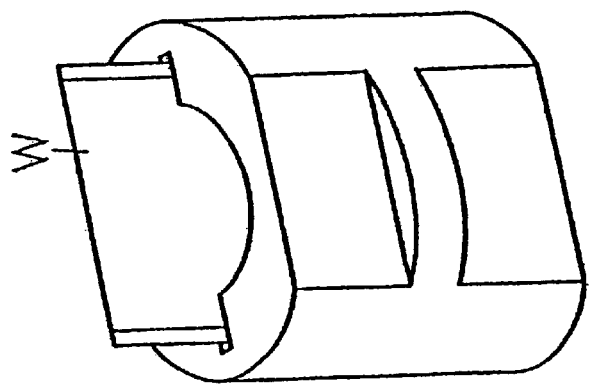
FIG. 14(b) shows the empty bag W inserted into the retainer.
Figure 14A:
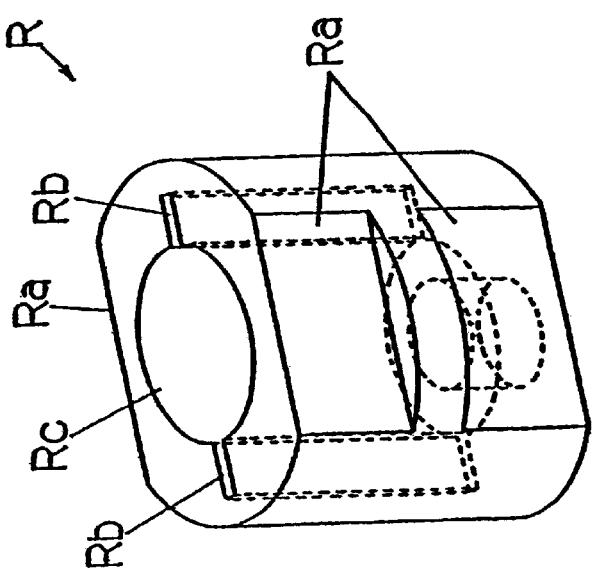
FIG. 14(a) shows the structure of the retainers.

Empty retainers R (shown for example in FIG. 14(a)) are supplied with empty bags W by the bag supply device 2 (which will be described in detail later), and the side edges of the empty bags W are inserted into the insertion grooves Rb of the retainers R (see FIG. 14(b)), and the retainers R are conveyed to the bag mouth opening device 3.

The bag mouth opening device 3 is a rotary type bag mouth opening device, and it is equipped with a processing rotor (opening rotor) 16 which has a plurality of opening means disposed at equal intervals around its circumference. When retainers R which have empty bags W inserted into their insertion grooves Rb are introduced, the opening means open the mouths of the empty bags W by applying vacuum suction from both sides during one rotation of the bag mouth opening device 3 (see changes shown in FIG. 14(b)→14(c)) and feed the empty bags W into the next process. The introduction of retainers R onto the processing rotor 16 is accomplished by a timing screw 17 and star wheel 18a which rotate in synchronization, and the feed-out of retainers R into the next process is accomplished by a star wheel 18b and timing screw 19.

The liquid preparatory filling device 4, solid matter filling device 5, liquid filling device 6, steam degassing device 7 and sealing device 8 are all rotary type devices. The introduction and feed-out of retainers R are accomplished by star wheels and timing screws.

The bags (or containers) are preparatorily filled with liquid by the liquid preparatory filling device 4, filled with solid matter by the solid matter filling device 5, and further filled with liquid by the liquid filling device 6. In this case, the preparatory filling with liquid is performed prior to filling with solid matter so as to prevent in advance the accumulation of air in the bottom of the bag that would be caused as a result of the filling with solid matter. Next, steam is blown in by the steam degassing device 7 so as to drive the air out of the bag, and the mouth of each bag is immediately provisionally sealed; and in the sealing device 8, a second sealing and cooling-sealing (cooling of the sealed portion) are performed.

In the discharge device 10, the sealed fill bags (or filled bags) are extracted from the conveyed retainers R, and the extracted bags are discharged onto the productconveying conveyor 9 so that the bags are lined up. The empty retainers R are fed out from the discharge device 10 and conveyed toward the bag supply device 2 along the main conveying path 1.

The defective retainer discharge path 11 branches off from the main conveying path 1 on the downstream side of the solid matter filling device 5 and rejoins the main conveying path 1 on the upstream side of the bag supply device 2.

More specifically, a defective retainer discharge means (not shown) removes empty retainers into which no bag has been inserted from the main conveying path 1, and it also removes retainers into which defective bags (bags with problems that would hinder normal packaging processing, such as bags that have not been opened, bags that have undergone a positional shift inside the retainer, bags with insufficient measurements or bags with liquid adhering to the sealed portion, etc.) have been inserted from the main conveying path 1. The defective retainer discharge means further feeds these removed retainers onto the defective retainer discharge path 11. The defective bags are then extracted from the retainers by the defective bag discharge device 12, and the empty retainers are caused to rejoin the main conveying path 1 (1a).

The cleaning path 13 connects the downstream side of the discharge device 10 and the upstream side of the bag supply device 2. When the retainers have become soiled, this path is used instead of the main conveying path 1(1a). The soiled retainers are cleaned by the retainer cleaning device 14 and dried by the drying device 15; afterward, the retainers are fed out onto the main conveying path 1 at a point which is on the upstream side of the bag supply device 2.

Figure 2:
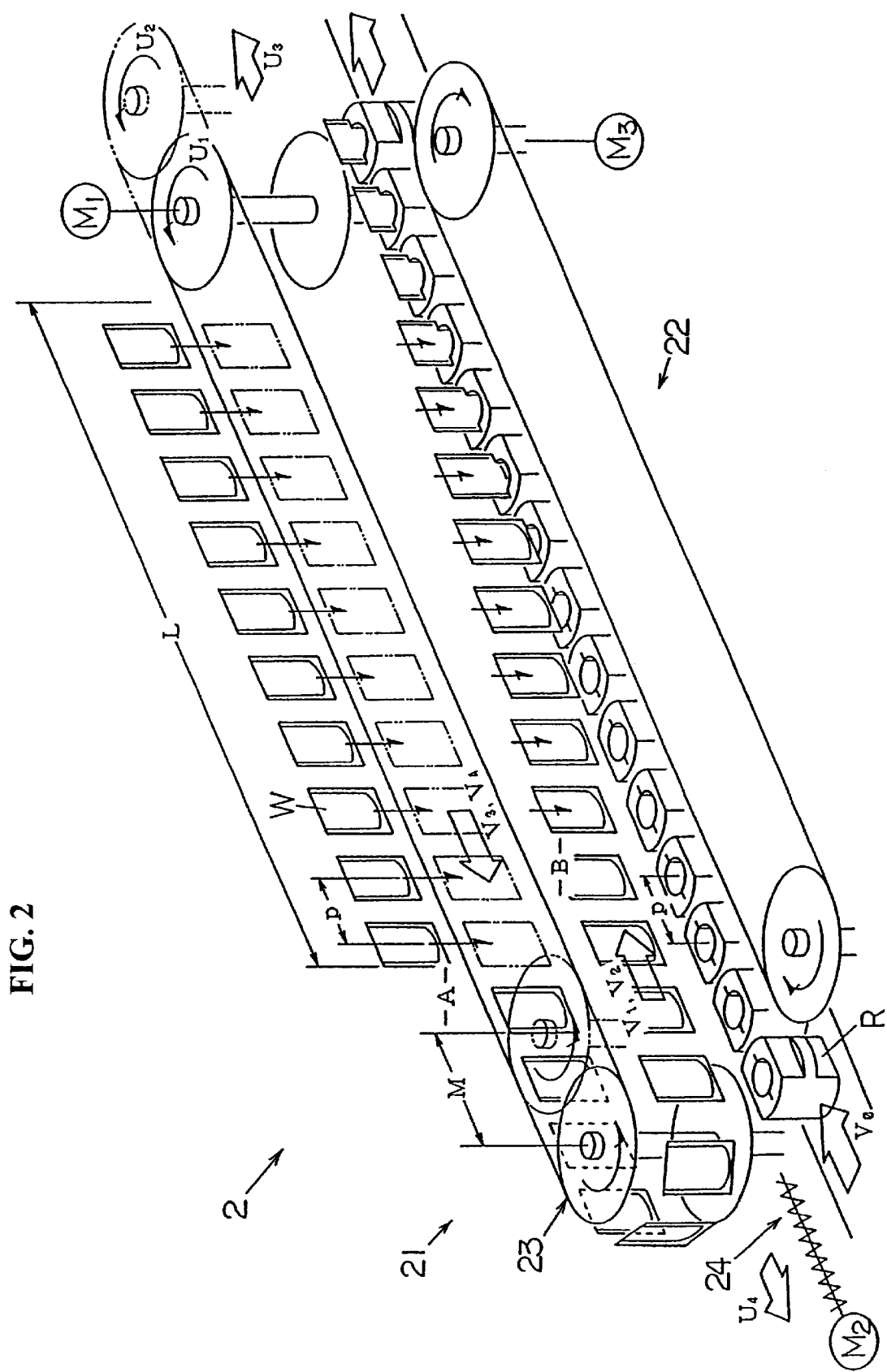
FIG. 2 is a conceptual diagram which explains the function of the bag supply device of the present invention.

Next, the bag supply device 2 in the present invention will be described in detail. FIG. 2 shows the bag supply device 2 used in the present invention.

The bag supply device 2 comprises an empty-bag holding member conveying device 21, an empty-bag supply device (not shown), a retainer conveying device 22 and a bag insertion device (not shown).

The empty-bag holding member conveying device 21 includes a rotational conveying mechanism 23 and a reciprocating driving mechanism 24. The rotational conveying mechanism 23 rotationally conveys numerous empty-bag holding members (in FIG. 2, empty bags W are shown instead of the empty-bag holding members) disposed at equal intervals on an endless conveyor chain in one direction along a ring-form track (or a race-track shape path) that has a pair of parallel sections (driving in this case is accomplished by a variable-speed driving motor $M_1$). The reciprocating driving mechanism 24 causes a reciprocating movement of the rotational conveying mechanism 23 as a whole through a specified distance along the parallel sections (driving in this case is accomplished by means of a variable-speed driving motor $M_2$).

The empty-bag supply device (not shown) is disposed on a first side (i.e., on the empty-bag supply side A) of the parallel sections and supplies empty bags W to a plurality of empty-bag holding members that are moved along the empty-bag supply side A, thus supplying one empty bag W to each empty-bag holding member.

Meanwhile, the retainer conveying device 22 is disposed on a second side (i.e., the retainer side B) of the parallel sections. The retainer conveying device 22 continuously conveys numerous retainers R at equal intervals and at a constant speed along the parallel section. The insertion device extracts empty bags W from the empty-bag holding members that are moved along the retainer side B and further inserts these empty bags W into the retainers R being conveyed underneath. The attachment pitch of the empty-bag holding members on the conveyor chain of the rotational conveying mechanism 23 is set to be equal to the conveying pitch of the retainers R.

In the empty-bag holding member conveying device 21, the rotational conveying mechanism 23 rotationally conveys empty-bag holding members by means of the variable-speed driving motor $M_1$ The rotational conveying mechanism 23 as a whole makes a reciprocating movement for a specified distance along the parallel sections by the variable-speed driving motor $M_2$. Meanwhile, the retainer conveying device 22 conveys retainers R at a constant speed ($V_0$) in the same direction as the conveying direction on the retainer side B of the ring-form track by the driving motor $M_3$.

The rotational conveying speed of the empty-bag holding members produced by the driving motor $M_1$ and the speed of the reciprocating movement of the rotational conveying mechanism 23 produced by the driving motor $M_2$ are set to be different between its advancing movement (movement in the conveying direction of the retainers R which is the movement from the solid line toward the two-dot chain line in FIG. 2) and return movement (movement from the two-dot chain line toward the solid line). In this case, on the empty-bag supply side A, the rotational conveying speed ($U_1$) of the empty-bag holding members produced by the driving motor $M_1$ during the advancing movement and the speed of the advancing movement ($U_3$) of the rotational conveying mechanism 23 produced by the driving motor $M_2$ are synthesized (or mutually canceled) so that the moving speed of the empty-bag holding members becomes zero. Furthermore, on the retainer side B, the rotational conveying speed of the empty-bag holding members ($U_1$ during advancing movement, $U_2$ during return movement) produced by the driving motor $M_1$ during reciprocating movement and the reciprocating movement speed of the rotational conveying mechanism 23 ($U_3$ during advancing movement, $U_4$ during return movement) produced by the driving motor $M_2$ are also synthesized, so that the moving speed of the empty-bag holding members is always the same as the conveying speed of the retainers R.

As a result of setting the speeds as described above, empty bags W are supplied to empty-bag holding members, which have a moving speed of zero (i.e., which are in a stopped state), from the empty-bag supply device (not shown) during the advancing movement of the rotational conveying mechanism 23 on the empty-bag supply side A. On the other hand, on the retainer side B, empty bags W are discharged from empty-bag holding members, which is moving at the same speed as the retainers R, and continuously put in the retainers R. Since empty bags W are supplied to a plurality of empty-bag holding members at one time on the empty-bag supply side A, the working efficiency of the bag supply device 2 is improved.

In the above-described bag supply device 2, the driving conditions, etc. of the respective driving motors can be determined once the conditions are set. The conditions are, for instance, the processing capacity S (bags/minute), the number of bags n supplied at one time (number), the conveying pitch of the retainers R (which is equal to the attachment pitch of the empty-bag holding members) p and the advancing movement time of the rotational conveying mechanism 23 (which is equal to intermittent stopping time of the empty-bag holding members on the empty-bag supply side A) $t_1$ (seconds).

The formulae shown below are examples of calculations for a case in which it is assumed that the switching from the speed during advancing movement to the speed during return movement (or the switching from the speed during return movement to the speed during advancing movement) is performed instantly in the respective driving motors as shown in FIG. 3.

In the formulae shown below, the respective symbols have the following meanings:

$t_2$: return movement time of the rotational conveying mechanism (=) intermittent moving time of the container holding members on the empty-bag supply side A)

M (m): advancing movement distance (=return movement distance) of the rotational conveying mechanism $U_1$ (m/minute): rotational conveying speed of the empty-bag holding members (during advancing movement of the rotational conveying mechanism)

$U_2$ (m/minute): rotational conveying speed of the empty-bag holding members (during return movement of the rotational conveying mechanism)

$U_3$ (m/minute): advancing movement speed of the rotational conveying mechanism $U_4$ (m/minute): return movement speed of the rotational conveying mechanism $V_o$ (m/minute): conveying speed of the retainers $V_1$ (m/minute): synthesized moving speed of the empty-bag holding members on the retainer side B (during advancing movement of the rotational conveying mechanism)

$V_2$ (m/minute): synthesized moving speed of the empty-bag holding members on the retainer side B (during return movement of the rotational conveying mechanism)

$V_3$ (rn/minute): synthesized moving speed of the empty-bag holding members on the empty-bag supply side A (during advancing movement of the rotational conveying mechanism)

$V_4$ (m/minute): synthesized moving speed of the empty-bag holding members on the empty-bag supply side A (during return movement of the rotational conveying mechanism)

$$t_2=60 \times n/S - t_1$$

$$M=(t_1 \times S \times p/2)/60$$

$$U_1=S \times p/2$$

$$U_2=S \times P+(t_1 \times S \times p/2)/(60 \times n/S-t_1)$$

$$U_3=S \times p/2$$

$$U_4=(t_1 \times S \times p/2)/(60 \times n/S-t_1)$$

$$V_o=V_1=V_2=p \times S$$

$$V_3=0$$

$$V_4=60 \times n \times p/(60 \times n/S-t_1).$$

Furthermore, where L is the distance that the empty-bag holding members are conveyed during the return movement on the empty-bag supply side A (i.e., the distance obtained by synthesizing the conveying distance of the rotational conveying mechanism and the distance of the return movement of the rotational conveying mechanism), this L can be called the distance advanced at a synthesized speed of $V_4$ during the return movement time ($t_2/60$) minutes. Therefore, L can be expressed as follows:

$$L=V_4 \times t_2/60$$

Furthermore, the following is obtained by substituting $V_4$ and $t_2$ into this equation:

$$L=p \times n$$

In other words, on the empty-bag supply side A of the rotational conveying mechanism 23, n number of empty-bag holding members are conveyed at a time during the return movement time, and n number of empty bags W are supplied at a time during the advancing movement time. As a result, a successive supply of empty bags W can be intermittently performed for all of the empty-bag holding members, and the conveying of empty-bag holding members with empty bags missing can be prevented.

Furthermore, in the above-described examples of calculation, it is assumed that the switching of the speeds of the respective driving motors is performed instantaneously. In an actual device, however, the switching of the speeds of the driving motors cannot be performed instantaneously, and acceleration and deceleration operations occur only during switching. Accordingly, calculations must be performed with this point taken into account.

Figure 4:
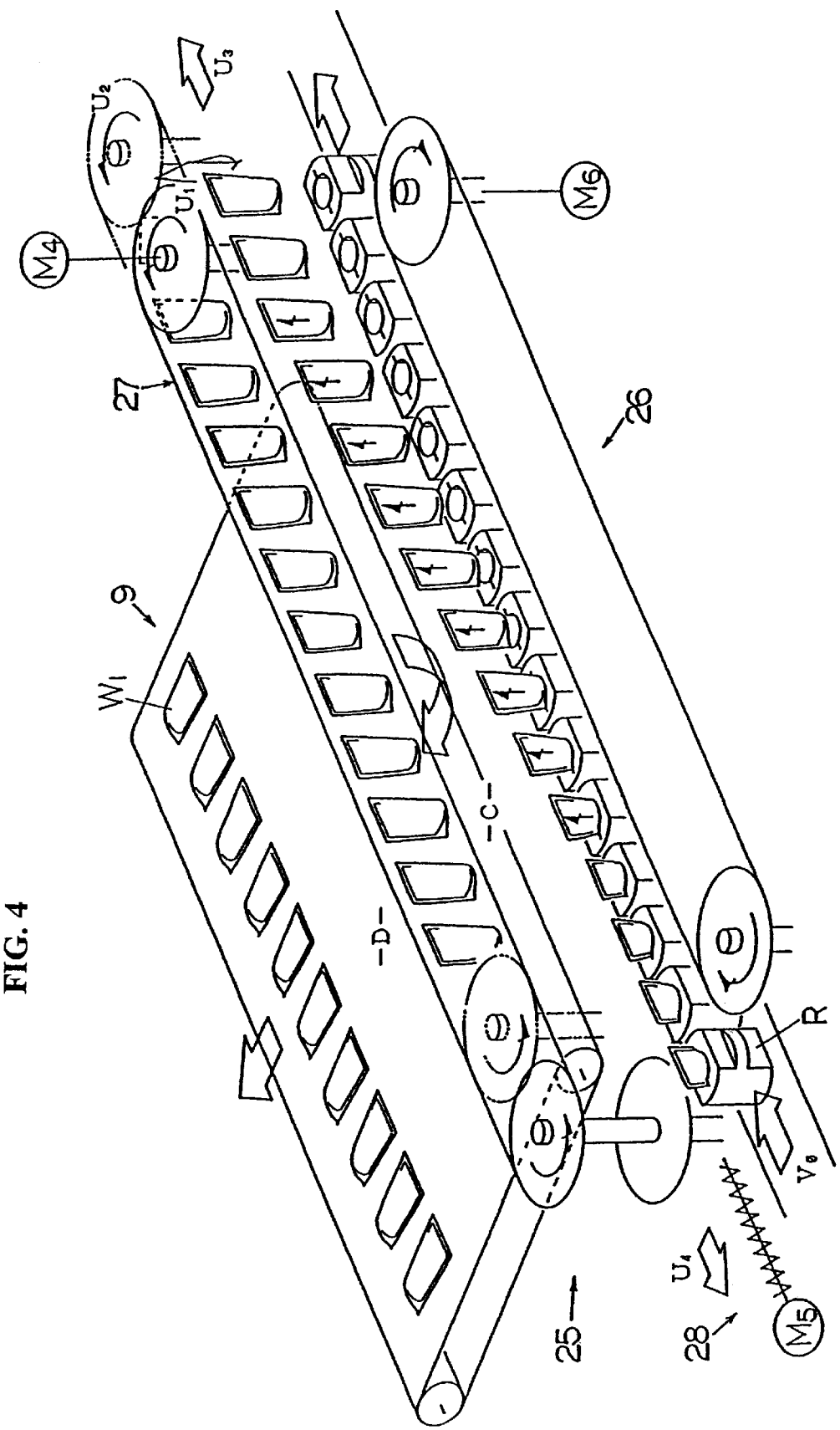
FIG. 4 is a conceptual diagram showing the function of the discharge device of the present invention.
Figure 5:
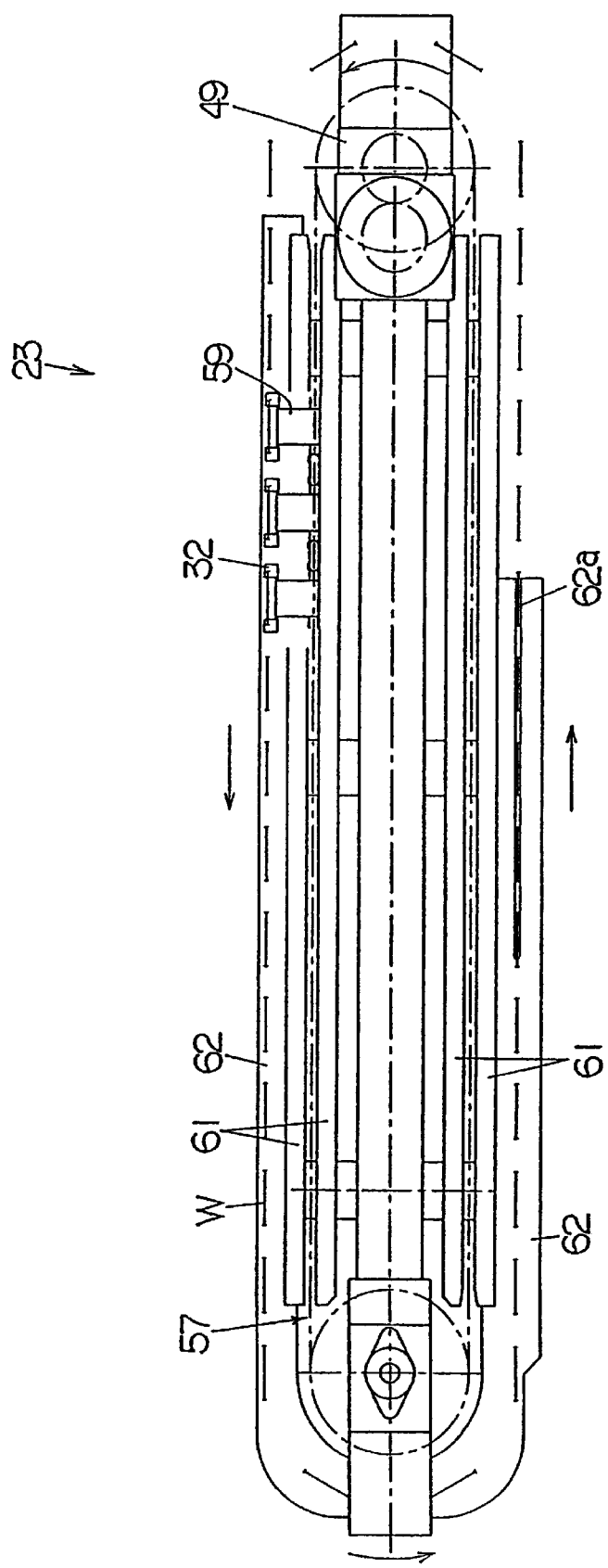
FIG. 5 is a plan view of the empty-bag holding member conveying device of the bag supply device of the present invention.

FIG. 4 is a schematic diagram of the discharge device 10 of the present invention. The discharge device 10 includes a conveying device (a full-bag holding member conveying device 25) of the present invention.

The discharge device 10 comprises a full-bag holding member conveying device 25 (including a full-bag holding member release device not shown) and a product-conveying conveyor 9. The full-bag holding member conveying device 25 is equipped with a rotational conveying mechanism 27, an operating mechanism (not shown), and a variable-speed reciprocating driving mechanism 28. The rotational conveying mechanism 27 rotationally conveys numerous full-bag holding members (in FIG. 4, full bags $W_1$ are shown instead of the full-bag holding members) disposed at equal intervals on an endless conveyor chain in one direction along a ring-form track that has a pair of parallel sections (driving in this case is accomplished by means of a variable-speed driving motor $M_4$). The operating mechanism (that includes the full-bag holding member release device) performs raising and lowering and opening and closing of the full-bag holding members as these members are rotationally conveyed. The variable-speed reciprocating driving mechanism 28 causes a reciprocating movement of the rotational conveying mechanism 27 as a whole through a specified distance along the parallel sections (driving in this case is accomplished by a variable-speed driving motor $M_5$).

The retainer conveying device 26 is disposed on the first side (the retainer side C) of the parallel sections and continuously conveys numerous retainers R at equal intervals and at a constant speed along the parallel section. The full-bag holding member release device and product-conveying conveyor 9 are respectively disposed on the second side (i.e., on the full-bag exit side D) of the parallel sections.

The full-bag holding members moving along the retainer side C are successively supplied with full bags $W_1$ from the respective retainers R (practically the full-bag holding members extract the full bags $W_1$ from the retainer R); and the full-bag holding members moving along the full-bag exit side D are operated on by the full-bag holding member release device and discharge full bags $W_1$ onto the product-conveying conveyor 9. The attachment pitch of the full-bag holding members on the conveyor chain of the rotational conveying mechanism 27 is set equal to the conveying pitch of the retainers R.

In the full-bag holding member conveying device 25, the rotational conveying mechanism 27 rotationally conveys the full-bag holding members by the variable-speed driving motor $M_4$, and the rotational conveying mechanism 27 as a whole is caused to perform a reciprocating movement along the parallel sections by the variable-speed driving motor $M_5$. Meanwhile, the retainer conveying device 26 conveys retainers R at a constant speed ($V_0$) in the same direction as the conveying direction on the retainer side C of the ring-form track by the driving motor $M_6$.

The rotational conveying speed of the full-bag holding members produced by the driving motor $M_4$ and the speed of the reciprocating movement of the rotational conveying mechanism 27 produced by the driving motor $M_5$ are set at different values during the advancing movement (movement in the conveying direction of the retainers R is designated as the advancing movement; this movement being from the solid line toward the two-dot chain line in FIG. 4) and return movement (movement from the two-dot chain line toward the solid line). In this case, on the full-bag exit side D, the rotational conveying speed ($U_1$) of the full-bag holding members produced by the driving motor $M_4$ during the advancing movement and the speed of the advancing movement ($U_3$) of the rotational conveying mechanism 27 produced by the driving motor $M_5$ are synthesized (mutually canceled), and the moving speed of the full-bag holding members becomes zero. Furthermore, on the retainer side C, the rotational conveying speed of the fill-bag holding members ($U_1$ during advancing movement, and $U_2$ during return movement) produced by the driving motor $M_4$ during reciprocating movement and the reciprocating movement speed of the rotational conveying mechanism 27 ($U_3$ during advancing movement, and $U_4$ during return movement) produced by the driving motor $M_5$ are synthesized, and the moving speed of the full-bag holding members is set so as to be always the same as the conveying speed of the retainers R.

As a result of the speeds being set as described above, full bags $W_1$ are continuously supplied from the retainers R to full-bag holding members that are moving at the same speed as the retainers on the retainer side C; and on the full-bag exit side D, the full-bag holding member release device acts on the full-bag holding members at a synthesized speed of zero (i.e., in a stopped state) during the advancing movement of the rotational conveying mechanism 27, so that full bags $W_1$ are discharged onto the product-conveying conveyor 9. Since full bags $W_1$ are discharged from a plurality of full-bag holding members at one time on the full-bag exit side D, the working efficiency of the discharge device 10 is improved, and full bags $W_1$ can be discharged onto the product-conveying conveyor 9 in a state in which a plurality of full bags $W_1$ are arranged in a row.

The driving conditions, etc. of the respective driving devices in this discharge device 10 are set in the same manner as in the bag supply device 2.

Next, the bag supply device 2 will be described more concretely with reference to FIGS. 5 through 14.

As shown in FIGS. 5 through 8, the empty-bag holding member conveying device 21 which forms a part of the bag supply device 2 comprises a reciprocating driving mechanism 24, which is installed on a bed 31, and a rotational conveying mechanism 23, which is installed on this reciprocating driving mechanism 24 and rotationally conveys numerous empty-bag holding members 32 along a ring-form track that has a pair of parallel sections.

The reciprocating driving mechanism 24 comprises: slide members 35 through 38 which are installed on the under surfaces of frames 33 and 34; rails 39 through 42 which are fastened to the bed 31 so that the slide members 35 through 38 are slidable along the surfaces thereof; bearings 43 and 44 which are fastened to the bed 31, a screw shaft 45 which is rotatably supported on these bearings; a variable-speed driving motor (servo motor) $M_2$ which rotationally drives the screw shaft 45; a nut member 46 which is fastened to the undersurface of the frame 33 and engages with the screw shaft 45; and supporting frames 47 and 48 which support the rotational conveying mechanism 23. By driving the driving motor $M_2$ in the forward and reverse directions, the reciprocating driving mechanism 24 can cause the rotational conveying mechanism 23 to perform a reciprocating movement to the left and right.

Figure 13:
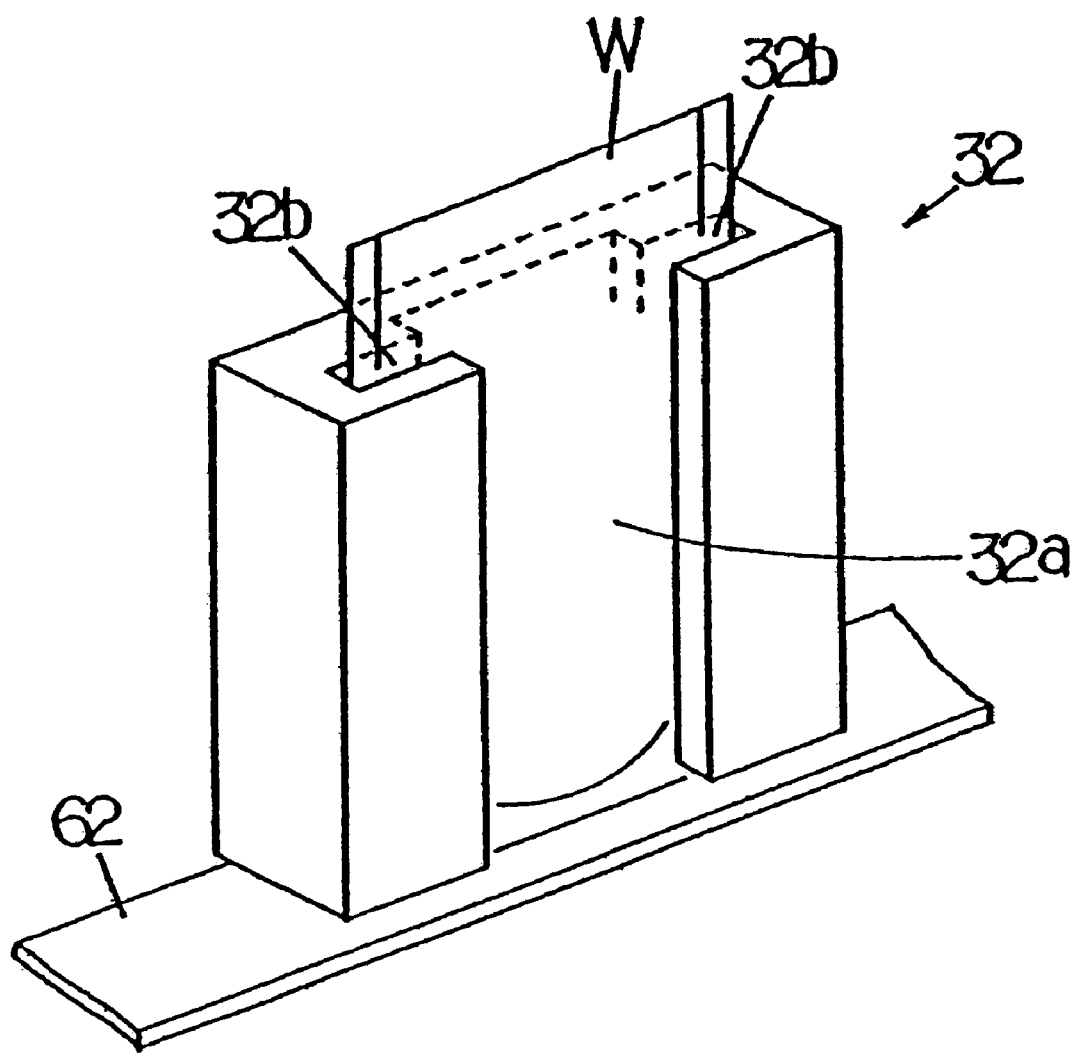
FIG. 13 is a diagram which illustrates the structure of the empty-bag holding members.

The rotational conveying mechanism 23 is equipped with: pivot shafts 51 and 52 which are rotatably supported on a main frame 49; sprockets 53 through 56 which are fastened to these pivot shafts 51 and 52; an upper conveyor chain 57 which is mounted between the upper sprockets 53 and 55; and a lower conveyor chain 58 which is mounted between the lower sprockets 54 and 56. Empty-bag holding members 32 are attached to these upper and lower conveyor chains 57 and 58 at equal intervals (pitch=p) via attachment members 59 so that the empty-bag holding members 32 face outward. As shown in FIG. 13, each of these empty-bag holding members 32 has a longitudinal groove 32a which opens on the front side; and longitudinally oriented slits 32b into which the empty bag W, particularly both side edge areas, is inserted are formed at an intermediate point in this longitudinal groove. Furthermore, the upper and lower conveyor chains 57 and 58 run while being guided on both sides by chain guides 61 respectively installed on the main frame 49 in the parallel sections.

This rotational conveying mechanism 23 has a variable-speed driving motor (servo motor) $M_1$. The driving force of this motor is transmitted to the pivot shaft 51 via gears, and the conveyor chains 57 and 58 are caused to rotate via the sprockets 53 through 56, so that the empty-bag holding members 32 are rotationally conveyed along the ring-form track.

In addition, a bag-receiving stand 62 is installed along the ring-form track of the empty-bag holding members 32 around the periphery of the main frame 49 leading from the empty-bag supply side A to the retainer side B. This bag-receiving stand 62 is used in order to prevent the empty bags W accommodated in the slits 32b of the empty-bag holding members 32 from dropping out at an intermediate point. A groove 62a which allows the empty bags W to drop out from an intermediate point is formed on the retainer side B, and an insertion guide 63 which guides the empty bags W into the grooves of the retainers R (which are conveyed underneath at a constant speed) is attached to the undersurface of the above-described groove 62a. As shown, for example, in FIG. 14, the retainers R have parallel sections Ra on their outer walls; and inside thereof, the retainers R further have grooves Rb into which the empty bags are inserted and bottom-equipped retaining holes Rc with substantially circular cross-sectional shapes which accommodate the body portions of the bags when the bags are opened.

Figure 9:
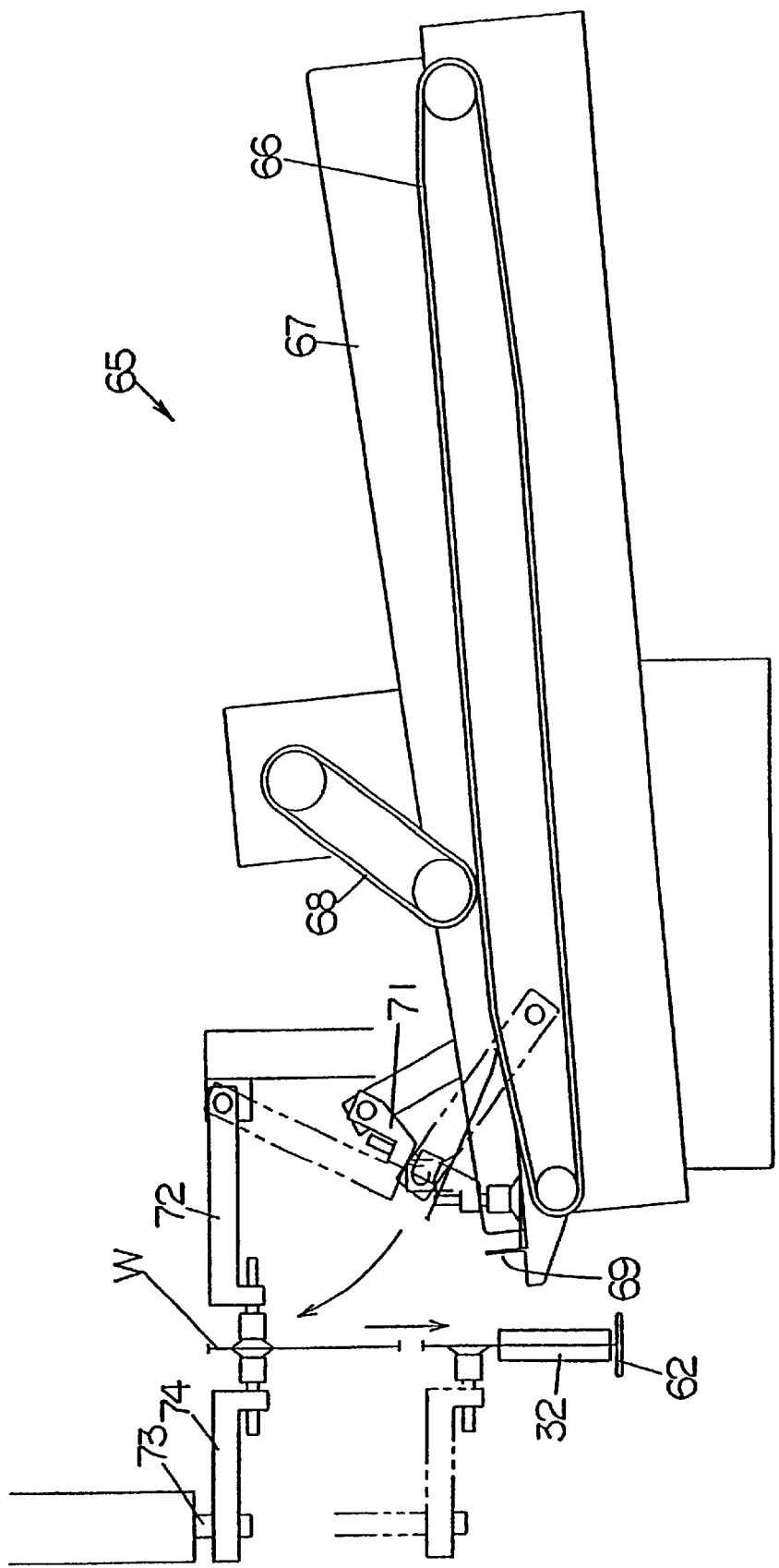
FIG. 9 is a side view of the intermittent empty bag supply device of the bag supply device of the present invention.

As shown in FIG. 9, an empty-bag supply device 65 which forms a part of the bag supply device 2 utilizes a conveyor magazine type bag supply device similar to that described in, for example, Japanese Patent Application Laid-Open (Kokai) No. 8-33721.

This empty-bag supply device 65 is provided with: a belt conveyor 66 which continuously conveys numerous empty bags placed on the outside of the ring-form track of the empty-bag holding members 32 in a partially overlapped state with the bag mouths facing forward and downward, guide plates 67 which are disposed on the left and right, and which guide both side edges of the empty bags, a fast-feed belt 68 which separates the leading empty bag conveyed by the belt conveyor 66 from the following empty bags and fast-feeds this leading empty bag forward, a vacuum-suction extraction arm 71 which vacuum-chucks each empty bag W that has stopped as a result of contacting a stopper 69 located in front, and lifts this bag by a specified distance, by means of a suction plate attached to the tip end of the vacuum-suction extraction arm 71, and a vacuum-suction swinging arm 72 which vacuum-chucks this empty bag W (by means of a suction plate attached to the tip end of the vacuum-suction swinging arm 72), pivots upward and carries the empty bag W to a point directly above one of the empty-bag holding members 32. Furthermore, a raising-and-lowering arm 74 which is raised and lowered by a raising-and-lowering shaft 73 is installed inside the ring-form track of the empty-bag holding members 32. By means of a suction plate attached to its tip end, this raising-and-lowering arm 74 receives the empty bag W, that has been brought to a position directly above the empty-bag holding member 32 by the vacuum-suction swinging arm 72, and lowers the empty bag W vertically downward, so that the empty bag W is inserted into the slits 32b of the empty-bag holding member 32.

A plurality of such empty-bag supply devices 65 (n units of devices 65) are installed side by side on the empty-bag supply side A, so that empty bags W can be simultaneously supplied to n empty-bag holding members 32.

Figure 10:
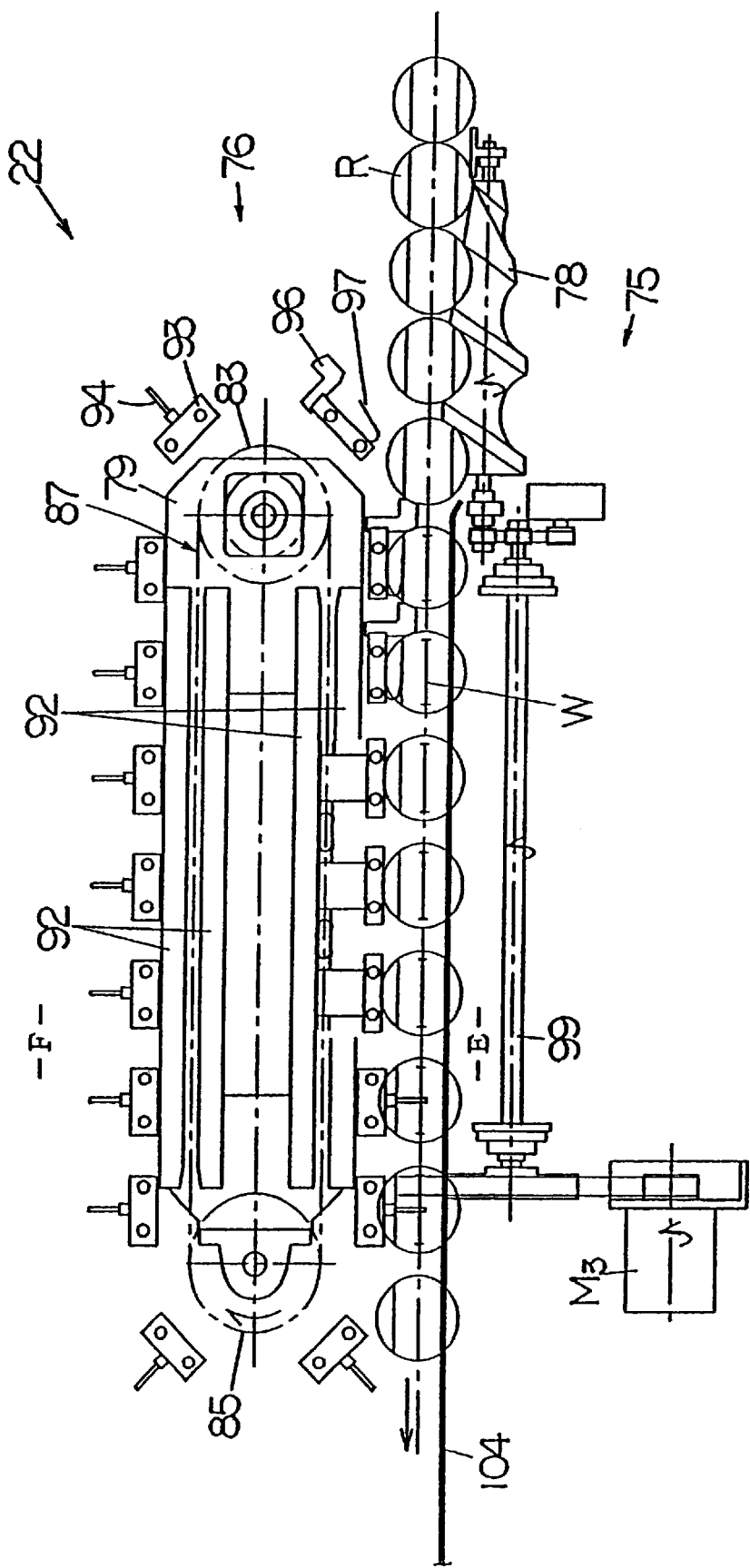
FIG. 10 is a plan view of the retainer conveying device of the bag supply device of the present invention.
Figure 11:
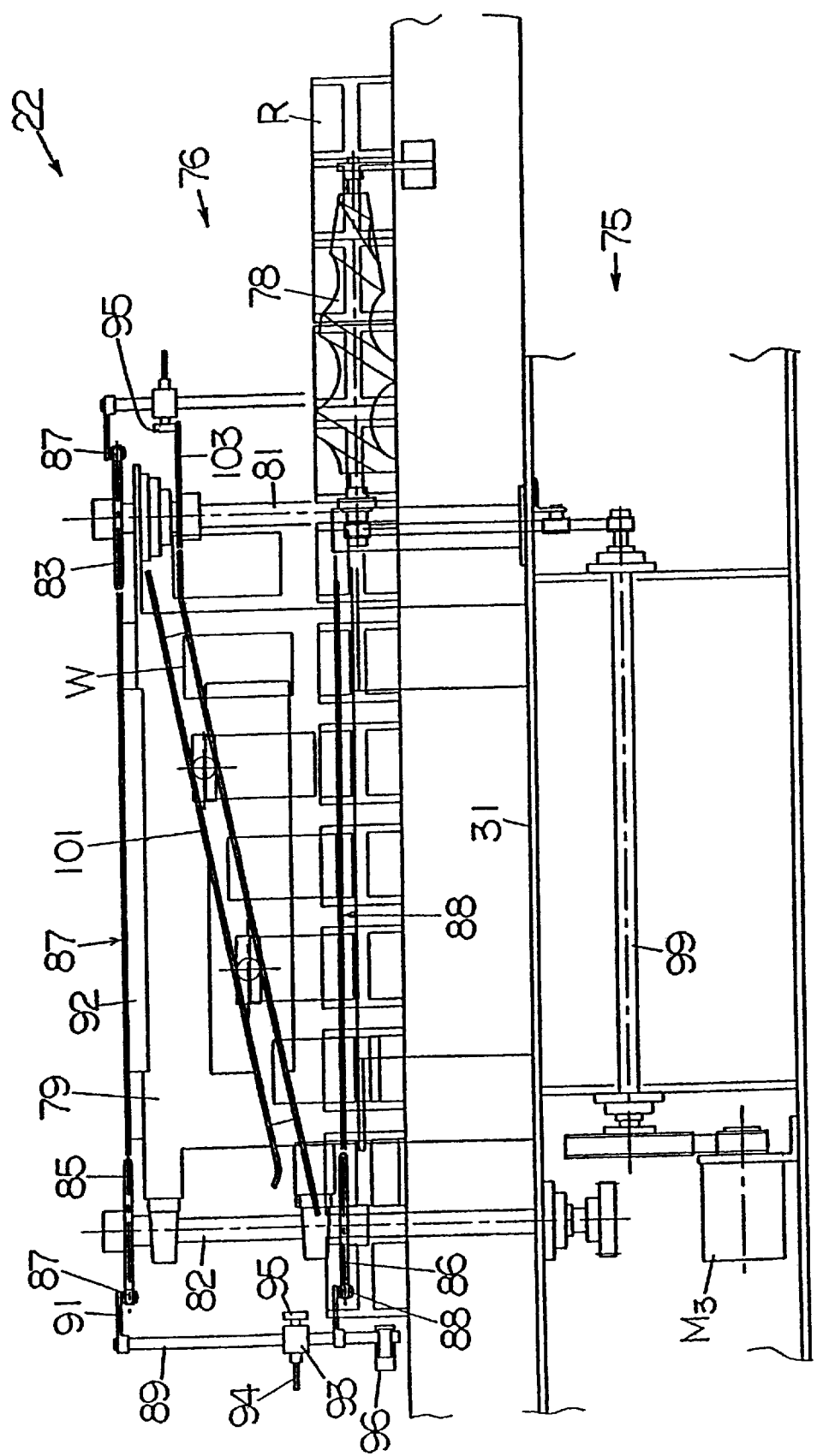
FIG. 11 is a side view thereof.
Figure 12:
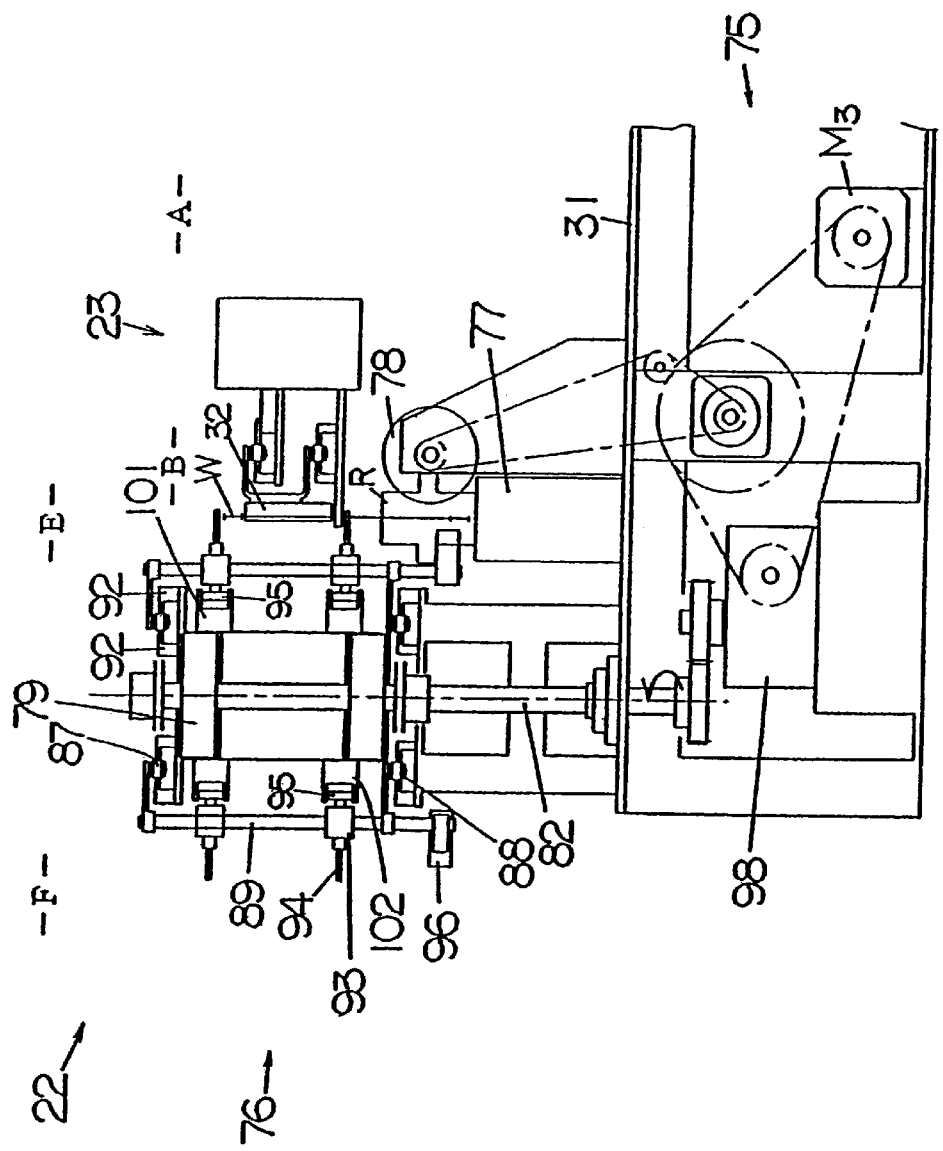
FIG. 12 is a front view thereof.

As shown in FIGS. 10 through 12, in the above-described bag supply device 2, the retainer conveying device 22 conveys the retainers R and inserts the empty bags W at the same time.

The retainer conveying device 22 comprises, along with other components, a driving mechanism 75 which is installed in the lower part of the bed 31, a combination retainer conveying and bag insertion mechanism 76 which is installed on the bed 31, a retainer-conveying conveyor 77 which carries retainers R and conveys these retainers over the main conveying path 1, and a retainer introduction screw 78.

The combination retainer conveying and bag insertion mechanism 76 is provided with: pivot shafts 81 and 82 which are rotatably supported on a main frame 79, sprockets 83 through 86 (84 is omitted from the figures) which are fastened to the pivot shafts, an upper conveyor chain 87 which is mounted between the upper sprockets 83 and 85, and a lower conveyor chain 88 which is mounted between the lower sprockets 84 and 86. Raising-and-lowering member guide shafts 89 are attached to these upper and lower conveyor chains 87 and 88 at equal intervals (pitch=p) via attachment members 91 so that these guide shafts 89 face outward. In the parallel sections, the upper and lower conveyor chains 87 and 88 run while being guided on both sides by respective chain guides 92 installed on the main frame 79. Raising-and-lowering members 93 are slidably provided on the raising-and-lowering member guide shafts 89; and empty-bag insertion pins 94 are attached to the raising-and-lowering members 93 so as to face outward, and cam followers (rollers) 95 are attached to the raising-and-lowering members 93 so as to face inward. Furthermore, retainer spacing maintaining members 96 and plate springs 97 are attached to the lower ends of the raising-and-lowering member guide shafts 89.

The driving mechanism 75 of this retainer conveying device 22 has a driving motor (servo motor) $M_3$; and the driving force of this driving motor $M_3$ is transmitted to the pivot shaft 82 via a belt, pulley, speed reduction mechanism 98 and gears, etc., so that the conveyor chains 87 and 88 are rotated via the sprockets 83 through 86. As a result, the raising-and-lowering member guide shafts 89 are rotationally conveyed along a ring-form track that has a pair of parallel sections. The driving force of the driving motor $M_3$ is transmitted to the retainer introduction screw 78 via a belt, pulley and transmission shaft 99, etc.

In the combination retainer conveying and bag insertion mechanism 76, raising-and-lowering member raising-and-lowering cams 101 and 102 are installed at an inclination along both parallel sections of the ring-form track of the raising-and-lowering member guide shafts 89, and the cam followers 95 run on these cams. Furthermore, a cam plate 103 is attached to the pivot shaft 81 (positioned on the retainer entry side) at a height that connects with upper ends of the raising-and-lowering member raising-and-lowering cams 101 and 102, and the cam followers 95 ride on this cam plate 103.

Furthermore, when the conveyor chains 87 and 88 are rotated by the driving motor $M_3$ so that the raising-and-lowering member guide shafts 89 perform a rotational movement at a constant speed, the cam followers 95 are moved along the raising-and-lowering member raising-and-lowering cams 101 and 102. As a result, on the retainer side E of the parallel sections, the raising-and-lowering members 93 are gradually lowered; and on the parallel section F on the opposite side, these raising-and-lowering members 93 are gradually raised. The height of this rising and falling action is set so that the tip ends of the empty-bag insertion pins 94 attached to the raising-and-lowering members 93 are positioned directly above the empty bags W held in the empty-bag holding members 32 on the high end of the retainer side E and so that the empty bags W can be extracted from the empty-bag holding members 32 and inserted into the retainers R located underneath on the low end of the retainer side E.

The combination retainer conveying and bag insertion mechanism 76 also serves to convey the retainers R (that have been placed on the retainer-conveying conveyor 77 and conveyed to the combination retainer conveying and bag insertion mechanism 76) at a constant conveying speed ($V_0$) and spacing (p) directly beneath the empty-bag holding members 32 located on the retainer side B. In other words, the conveying speed and spacing of the retainers R on the retainer-conveying conveyor 77 are first adjusted by means of the retainer introduction screw 78 and are then adjusted to a constant conveying speed ($V_0$) and spacing (p) by the retainer spacing maintaining members 96 which move at a constant speed together with the raising-and-lowering member guide shafts 89. When the retainers R are being conveyed, the parallel surfaces Ra are pressed against a retainer conveying guide 104 by the plate springs 97. As a result, the retainers R are positioned so that the positions of the bag insertion grooves Rb of the conveyed retainers R and the positions of the longitudinally oriented slits 32b of the empty-bag holding members 32 are aligned vertically.

The overall operation of the above bag supply device will again be described briefly.

The empty-bag holding member conveying device 21 first operates as described earlier with reference to FIG. 2, so that the empty-bag holding members 32 are reduced to a moving speed of zero (i.e., are in a stopped state) during the advancing movement of the rotational conveying mechanism 23 on the bag supply side A. During this time, the bag supply device 65 inserts empty bags W into the slits 32b of a plurality of empty-bag holding members 32 (i.e., n empty-bag holding members 32). In other words, empty bags W are supplied to the empty-bag holding members 32. Then, in a state in which the lower ends of the empty bags W are supported on the bag-receiving stand 62, the empty bags W are caused to move together with the empty-bag holding members 32 by the rotational conveying mechanism 23. Meanwhile, on the retainer side B, the empty-bag holding members 32 are moved at a constant speed ($V_0$); and the retainers R underneath the empty-bag holding members 32 are conveyed at the same conveying speed ($V_0$) and the same conveying pitch (p) as the empty-bag holding members 32 by the retainer conveying device 22, and they are further conveyed in a state in which these retainers R are aligned with the empty-bag holding members 32 in the vertical direction.

When the empty-bag holding members 32 arrive at the position of the groove 62a in the bag-receiving stand 62 on the retainer side B, the empty-bag insertion pins 94 begin to drop in the retainer conveying device 22, so that the empty bags W accommodated in the slits 32b of the empty-bag holding members 32 are pushed from above and extracted below; and these empty bags W are then inserted via the insertion guide 63 into the grooves Rb of the retainers R being conveyed underneath. In other words, the empty bags W are discharged from the empty-bag holding members 32.

Next, the discharge device 10 will be described more concretely with reference to FIGS. 15 through 17.

Figure 15:
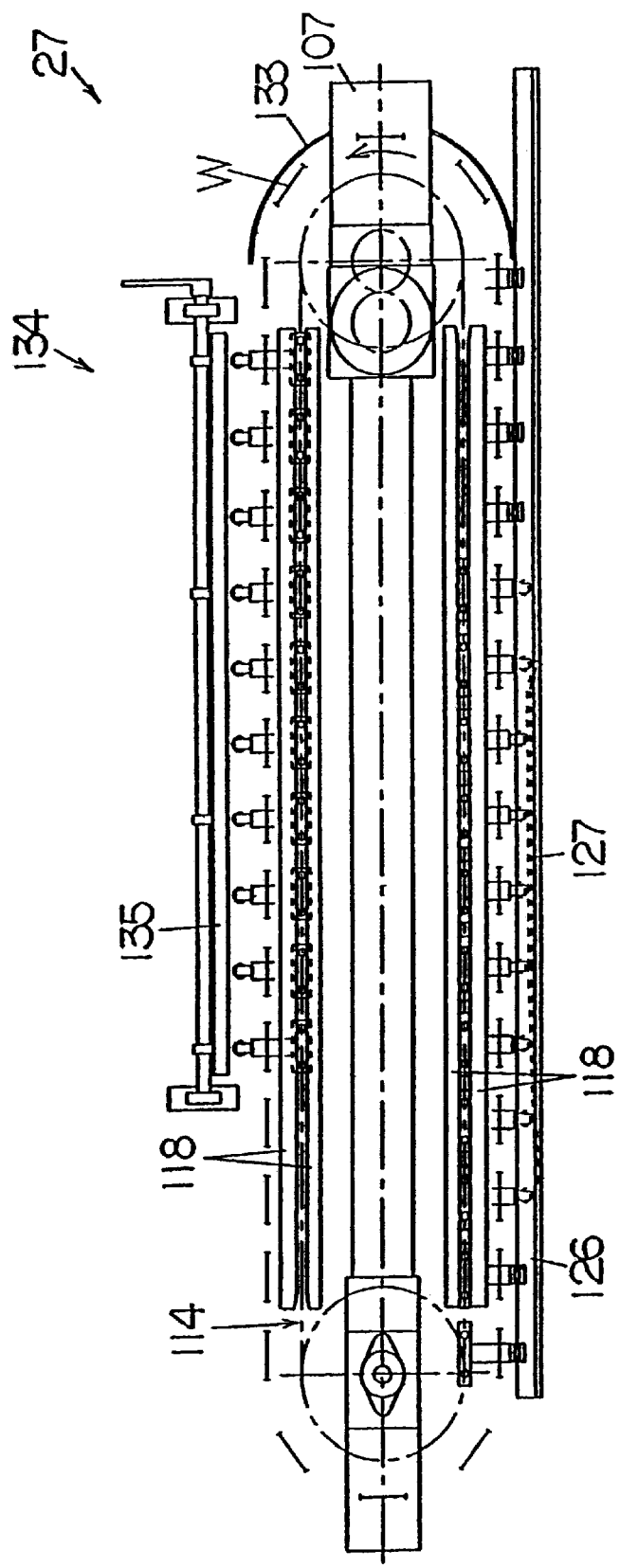
FIG. 15 is a plan view of the full-bag holding member conveying device of the bag discharge device of the present invention.
Figure 16:
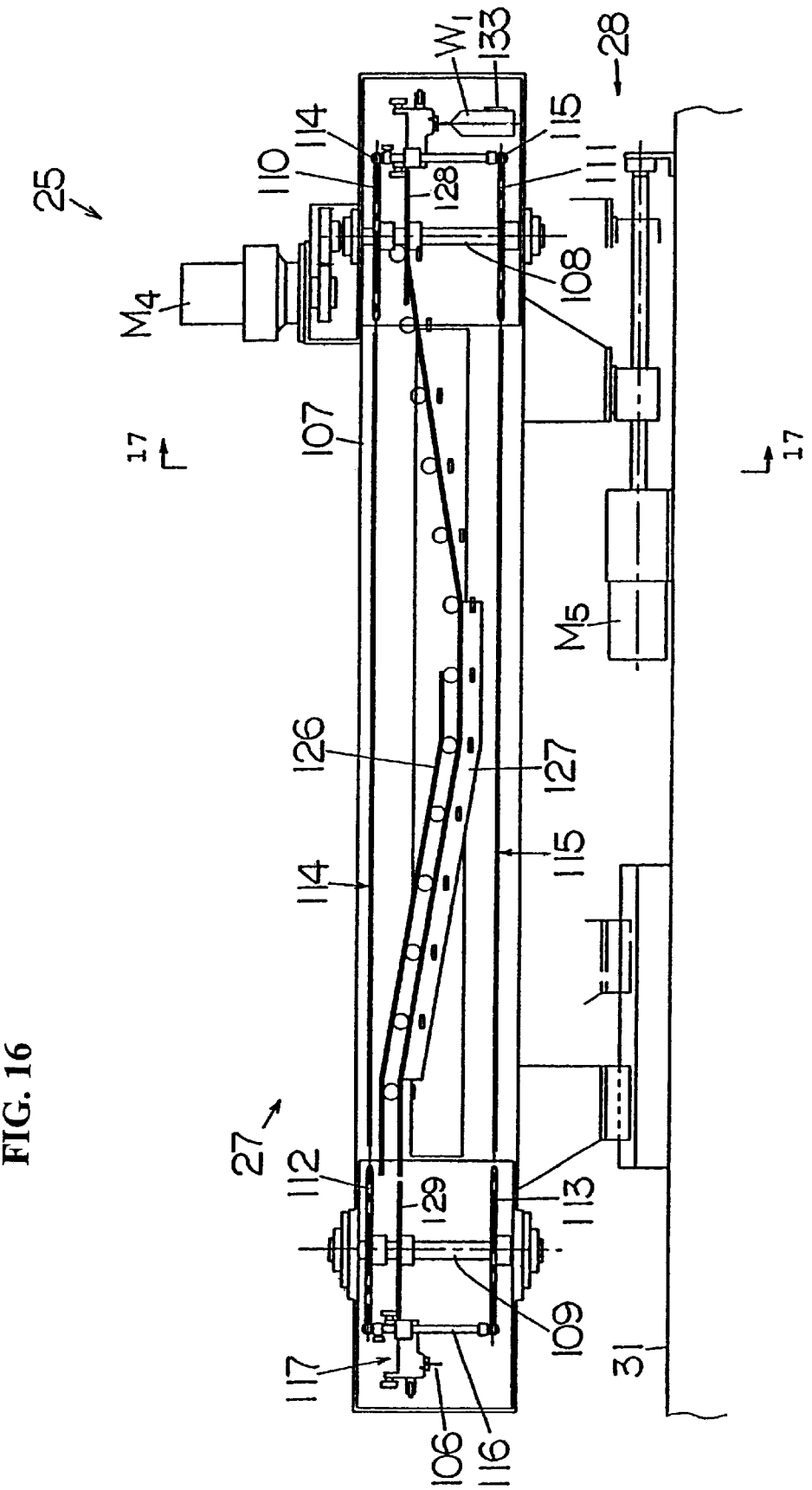
FIG. 16 is a side view thereof.
Figure 17:
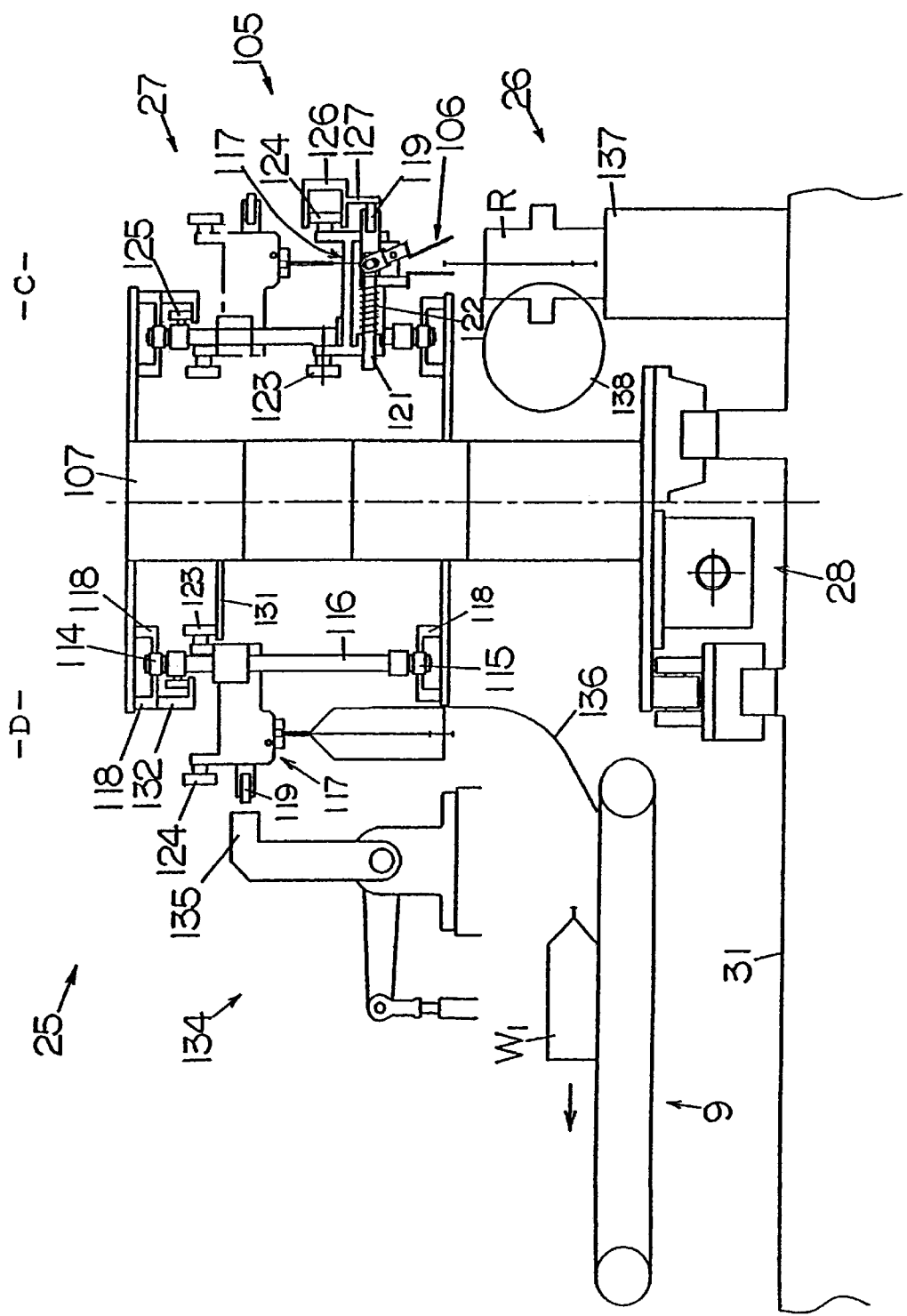
FIG. 17 is a sectional arrow view taken along the line 17—17 in FIG. 16.

As shown in FIGS. 15 through 17, the full-bag holding member conveying device 25 which forms a part of this discharge device 10 comprises: a reciprocating driving mechanism 28 which is installed on a bed 31, a rotational conveying mechanism 27 which is installed on this reciprocating driving mechanism 28 and rotationally conveys numerous full-bag holding members 106 along a ring-form track that has a pair of parallel sections, and an operating mechanism 105 which performs raising and lowering and opening and closing of the full-bag holding members 106 as the full-bag holding members 106 are rotationally conveyed.

Figure 6:
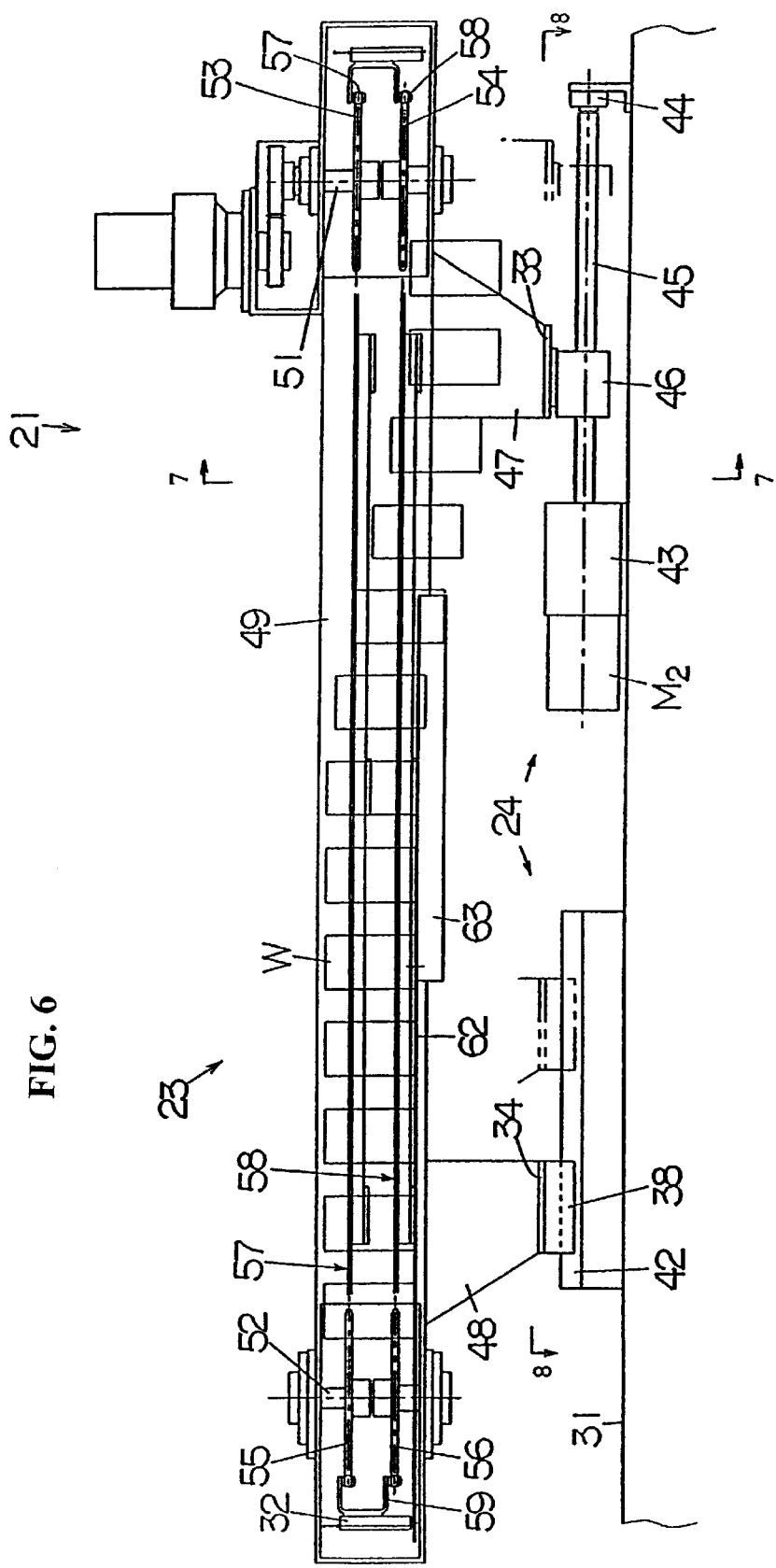
FIG. 6 is a side view thereof.
Figure 7:
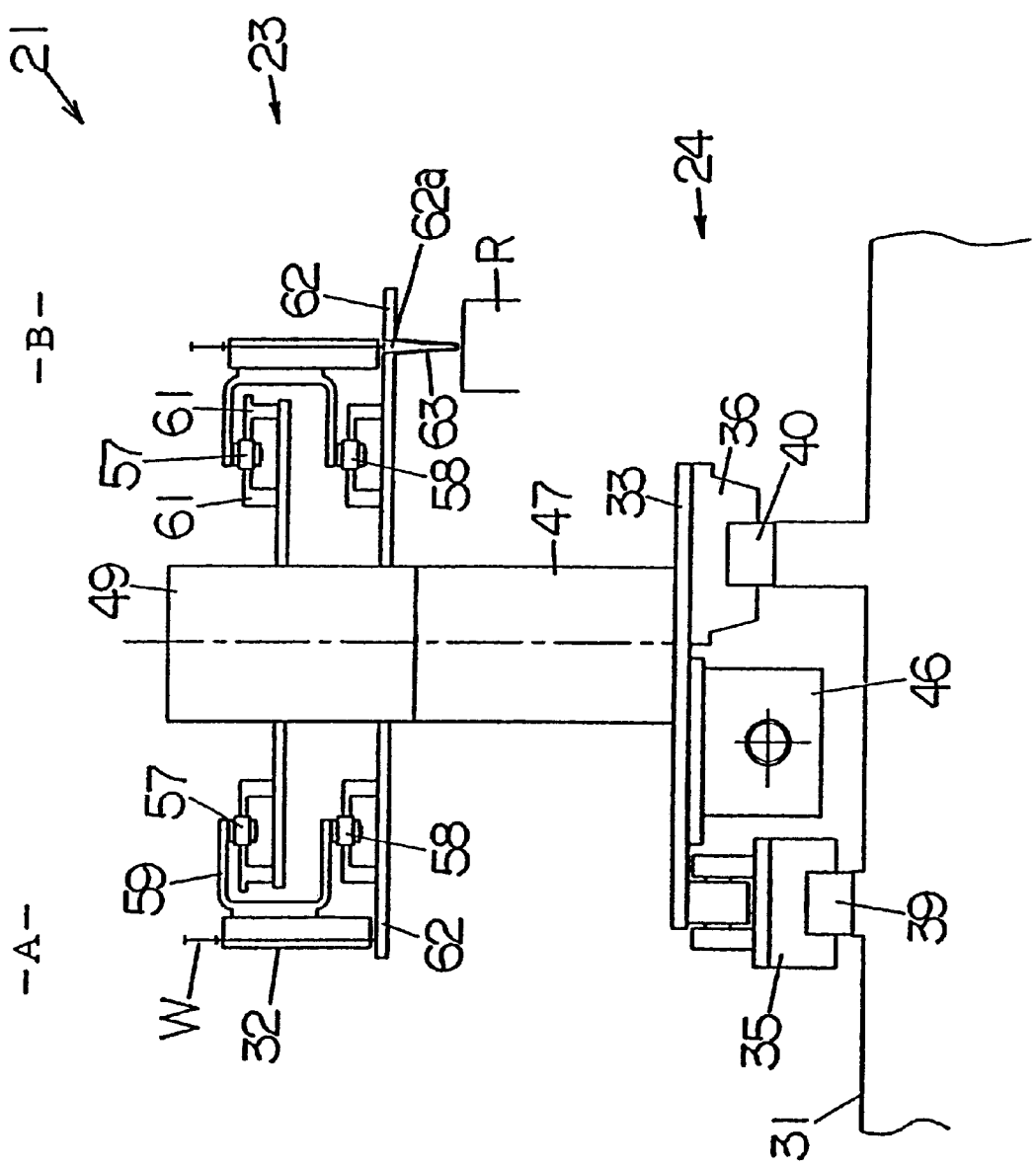
FIG. 7 is a sectional arrow view taken along the line 7—7 in FIG. 6.
Figure 8:
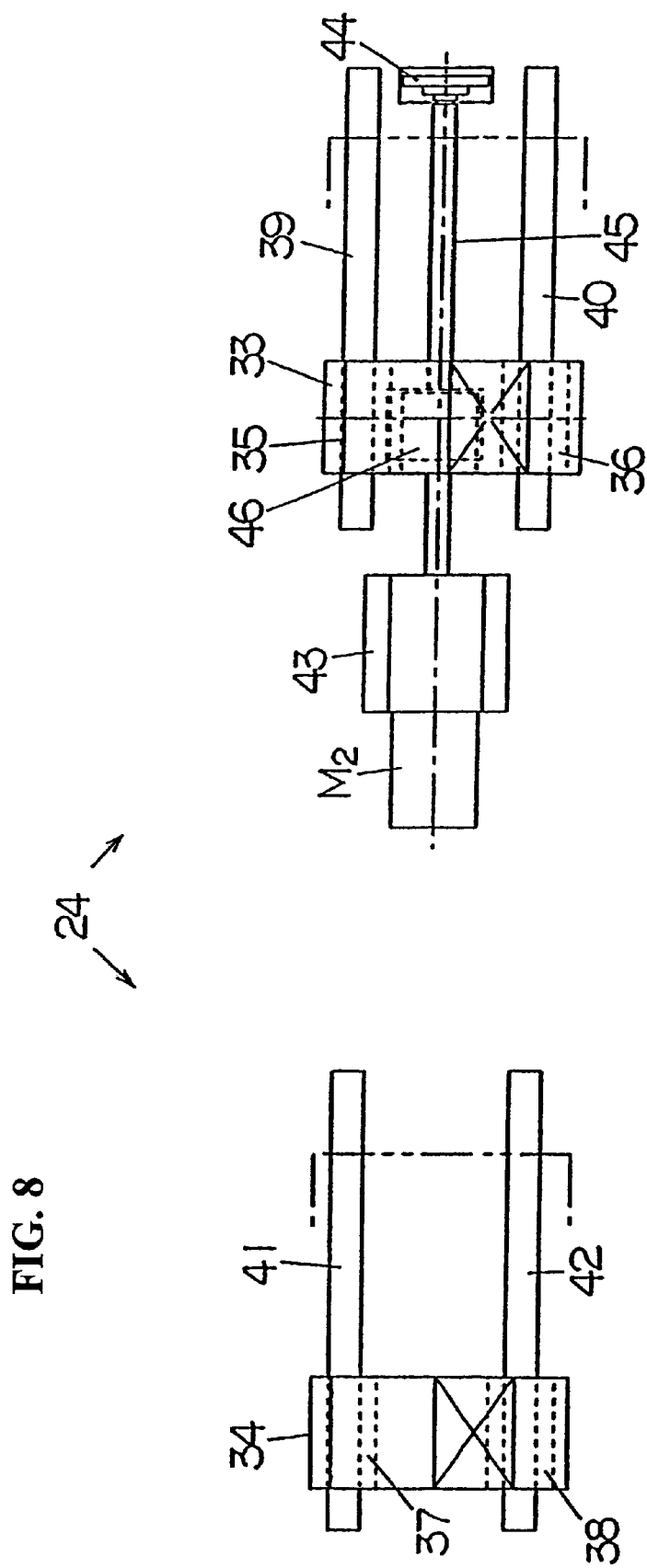
FIG. 8 is a sectional arrow view taken along the line 8—8 in FIG. 6.

The reciprocating driving mechanism 28 has the same structure as the reciprocating driving mechanism 24 illustrated in FIGS. 6 through 8. It can cause the rotational conveying mechanism 27 to perform a reciprocating movement to the left and right by driving the driving motor (servo motor) $M_5$ in the forward and reverse directions.

The rotational conveying mechanism 27 is also substantially the same as the rotational conveying mechanism 23. The rotational conveying mechanism 27 is equipped with: pivot shafts 108 and 109 which are supported on a main frame 107, sprockets 110 through 113 which are fastened to the pivot shafts 108 and 109, an upper conveyor chain 114 which is mounted between the upper sprockets 110 and 112, and a lower conveyor chain 115 which is mounted between the lower sprockets 111 and 113. Raising-and-lowering guide shafts 116 are attached at equal intervals (pitch=p) to these upper and lower conveyor chains 114 and 115, and raising-and-lowering cases 117 are attached to these raising-and-lowering guide shafts 116 so as to be freely raised and lowered. The upper and lower conveyor chains 114 and 115 are guided from both sides by chain guides 118 respectively installed on the main frame 107 in the parallel sections.

Full-bag holding members 106 are provided on the raising-and-lowering cases 117 so that the full-bag holding members face downward. Also provided on the raising-and-lowering cases 117 are: opening-and-closing rods 121 which are equipped with cam followers (rollers) 119 on their outward-facing end portions and open and close the full-bag holding members 106 by sliding inward and outward, compression springs 122 which are fitted over the opening-and-closing rods 121 and constantly drive the full-bag holding members 106 in the closing direction, and cam followers (rollers) 123 and 124 which are attached to the inward-facing end portions and outward-facing end portions of the raising-and-lowering cases 117. Meanwhile, cam followers (rollers) 125 which are attached to the upper portions of the raising-and-lowering guide shafts 116 so that these cam followers that face outward are also provided on the raising-and-lowering cases 117. A full-bag holding member raising-and-lowering cam 126 and an opening-and-closing cam 127 are provided on the retainer side C of the parallel sections of the ring-form track of the full-bag holding members 106. The respective cam followers 124 and 119 run on these cams so that the full-bag holding members 106 are raised and lowered or opened and closed. Furthermore, cam plates 128 and 129 are attached to the respective pivot shafts 108 and 109 at such a height that the raised positions of the full-bag holding members 106 can be maintained "as is". Moreover, a cam plate 131 is likewise attached on the bag exit side D of the parallel sections, and the cam followers 123 ride or run on this cam plate 131. Furthermore, a horizontal cam 132 which supports the weight of the raising-and-lowering guide shafts 116 and prevents sagging is installed around the upper periphery of the main frame 107, and the cam followers 125 fastened to the raising-and-lowering guide shafts 116 run on this horizontal cam 132.

In addition, a bag guide 133 which prevents shaking of the full bags $W_1$ is installed in the rotation area extending from the retainer side C to the full-bag exit side D.

The above-described raising-and-lowering cases 117 and respective associated members 119, 121 through 124, as well as the cams 126 and 127 and cam plates 128, 129 and 131, constitute the main parts of the operating mechanism 105.

Furthermore, a full-bag holding member release device 134 which constitutes another main part of the operating mechanism 105 is installed on the full-bag exit side D of the parallel sections. A lever 135 advances toward or withdraws from the cam followers 119, and the full-bag holding members 106 are opened as a result of the tip end of this lever 135 pushing the cam followers 119. Furthermore, the product-conveying conveyor 9 which is a part of the discharge device conveys the full bags $W_1$ (that slide down the chute 136) into the next process in a plurality of rows (n rows). Accordingly, this conveyor 9 is formed with a large width in order to allow the simultaneous dropping of a plurality of full bags $W_1$.

In FIGS. 15 through 17, the retainer conveying device 26 is omitted (in FIG. 17, only the positions of the retainer-conveying conveyor 137 and retainer introduction screw 138 are shown). However, the retainer conveying device 26 used in the discharge device also has a structure substantially the same as that of the retainer conveying device 22 shown in FIGS. 9 through 11 (except that there is no need for the parts related to the insertion of empty bags). Furthermore, the retainer conveying device 26 serves to convey the retainers R (which have been carried and conveyed on the retainer-conveying conveyor 137) at a constant conveying speed ($V_0$) and spacing (p) directly beneath the full-bag holding members 106 located on the retainer side C.

The overall operation of the above discharge device 10 will again be briefly described.

The full-bag holding member conveying device 25 first operates as described previously with reference to FIG. 4, so that the full-bag holding members 106 are moved at a constant speed ($V_0$) on the retainer side C. Beneath these full-bag holding members 106, the retainers R are conveyed by the retainer conveying device 26 at the same conveying speed ($V_0$) and conveying pitch (p) as the full-bag holding members 106 and in a state in which the retainers R are aligned with the full-bag holding members 106 in the vertical direction. Then, the full-bag holding members 106 that have been conveyed to the retainer side C are gradually lowered as a result of the cam followers 124 running along the full-bag holding member raising-and-lowering cam 126; and at the same time, the cam followers 119 come into contact with the full-bag holding member opening-and-closing cam 127 so that the full-bag holding members 106 are opened. Then, at the lowest point, the cam followers 124 separate from the full-bag holding member opening-and-closing cam 127, so that the full-bag holding members 106 close and grip the upper portions of the full bags $W_1$ accommodated in the retainers R; and further, the full-bag holding members 106 rise and extract the full bags $W_1$ from the retainers R. In other words, the full bags $W_1$ are supplied to the fall-bag holding members 106.

Then, the cam followers 123 of the full-bag holding members 106 ride on the cam plate 128 and further run along the horizontal cam 131 on the full-bag exit side D; and during this period, the full-bag holding members 106 maintain a specified height. On this full-bag exit side D, the fall-bag holding members 106 have a moving speed of zero (i.e., the full-bag holding members 106 are in a stopped state) during the advancing movement of the rotational conveying mechanism 27. During this period, the lever 135 of the full-bag holding member release device 134 advances and pushes the cam followers 119 inward with its tip end so that a plurality of full-bag holding members 106 (n full-bag holding members 106) are opened at the same time, and n full bags are caused to drop. In other words, full bags $W_1$ are discharged from the full-bag holding members 106 in n rows. Since the full-bag holding members 106 are in a stopped state relative to the product-conveying conveyor 9, and since a plurality of full bags $W_1$ drop at the same time, the plurality of full bags $W_1$ that drop onto the product-conveying conveyor 9 maintain a configuration of n rows.

As seen from the above, according to the present invention which is for an article conveying device wherein articles supplied intermittently in a plurality of rows are conveyed continuously in a single row or articles supplied continuously in a single row are discharged intermittently in a plurality of rows, a reciprocating driving mechanism which causes the article holding member rotational conveying mechanism as a whole to perform a reciprocating movement through a specified distance, and the rotational conveying mechanism and reciprocating driving mechanism are respectively provided with independent driving sources. As a result, the article conveying device can be endowed with all-purpose adaptability which allows the selection of desired patterns regarding the number of articles supplied and discharged at one time. Furthermore, an excessive load will not be applied to a single endless chain used for driving as in conventional system. Accordingly, no drop in positioning precision occurs even in the case of a high-speed operation.

What is claimed is:

1. An article conveying device comprising:

a rotational conveying mechanism which causes a rotational conveyance of a plurality of artcle holding members, which are disposed at equal intervals, in one direction along a ring-form-track that has a pair of parallel sections, and a reciprocating driving mechanism which causes said rotational conveying mechanism as a whole to perform a reciprocating movement for a specified distance along said parallel sections; and wherein said rotational conveying mechanism and reciprocating driving mechanic are respectively provided with their own driving sources, said driving sources of said rotational conveying mechanism and reciprocating driving mechanism are independent servo motors, said article holding members have a moving speed that is obtained by synthesizing said rotational conveyance and said reciprocating movement so that said article holding members are moved intermittently a specified distance, that is equal to an integral multiple of an attachment spacing of said plurality of article holding members, on a first side of said parallel sections and are moved continuously at a constant speed on a second side of said parallel sections, and a rotational conveying speed of said plurality of article holding members is set so as to be different in an advancing direction and a return direction of said rotational conveying mechanism.

2. The article conveying device according to claim 1, wherein a speed of said reciprocating movement in an advancing direction and a speed of said reciprocating movement in a return direction of said rotational conveying mechanism are set so as to be different.

3. The article conveying device according to claim 1 or 2, wherein articles are supplied simultaneously to said plurality of article holding members when said plurality of article holding members are stopped on said first side of said parallel sections, and said articles are successively discharged from said plurality of article holding members, which are moving continuously, on said second side of said parallel sections.

4. The article conveying device according to claim 1 or 2, wherein articles are continuously supplied to said plurality of article holding members, which are moving continuously, on said second side of said parallel sections, and said articles are simultaneously discharged from said plurality of article holding members when said plurality of article holding members are stopped on said first side of said parallel sections.

* * * * *